June 22, 1943.                    R. R. CEASE                    2,322,682
                                  RAILWAY TRUCK
                              Filed Nov. 1, 1941            2 Sheets-Sheet 2
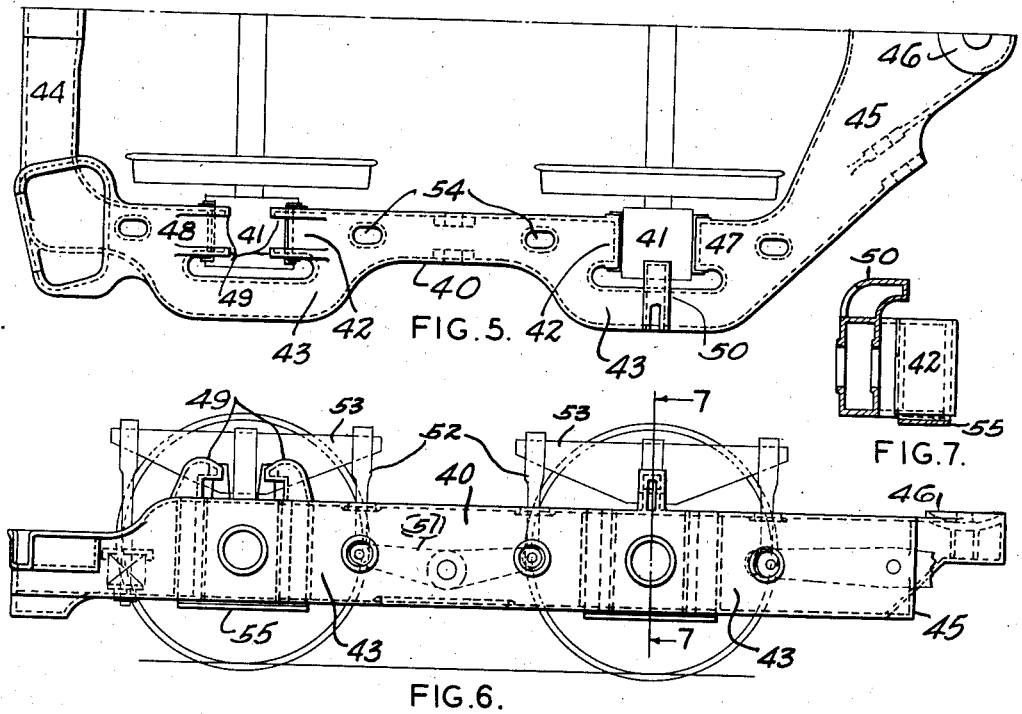
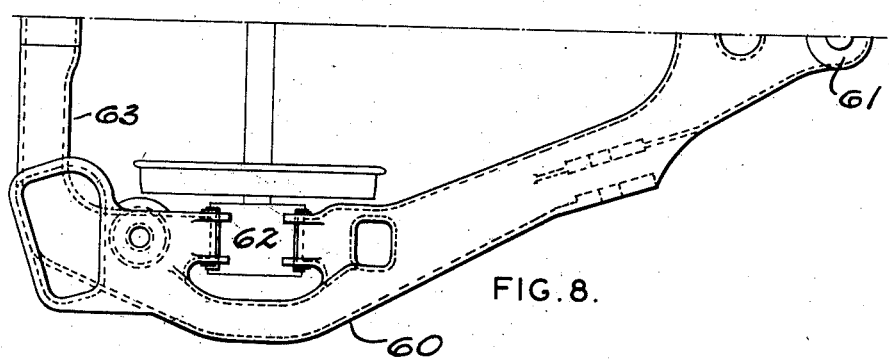
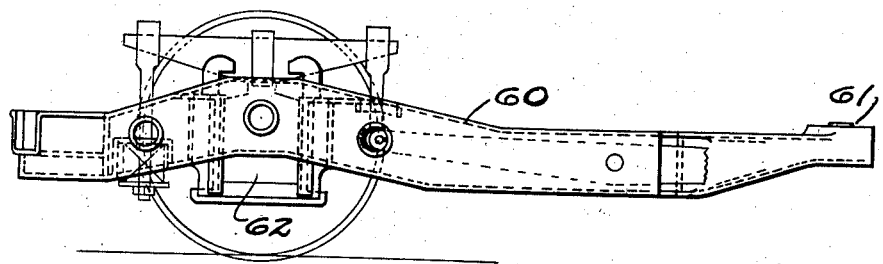
INVENTOR.
ROBERT R. CEASE
BY
Rodney Bedell
ATTORNEY Patented June 22, 1943

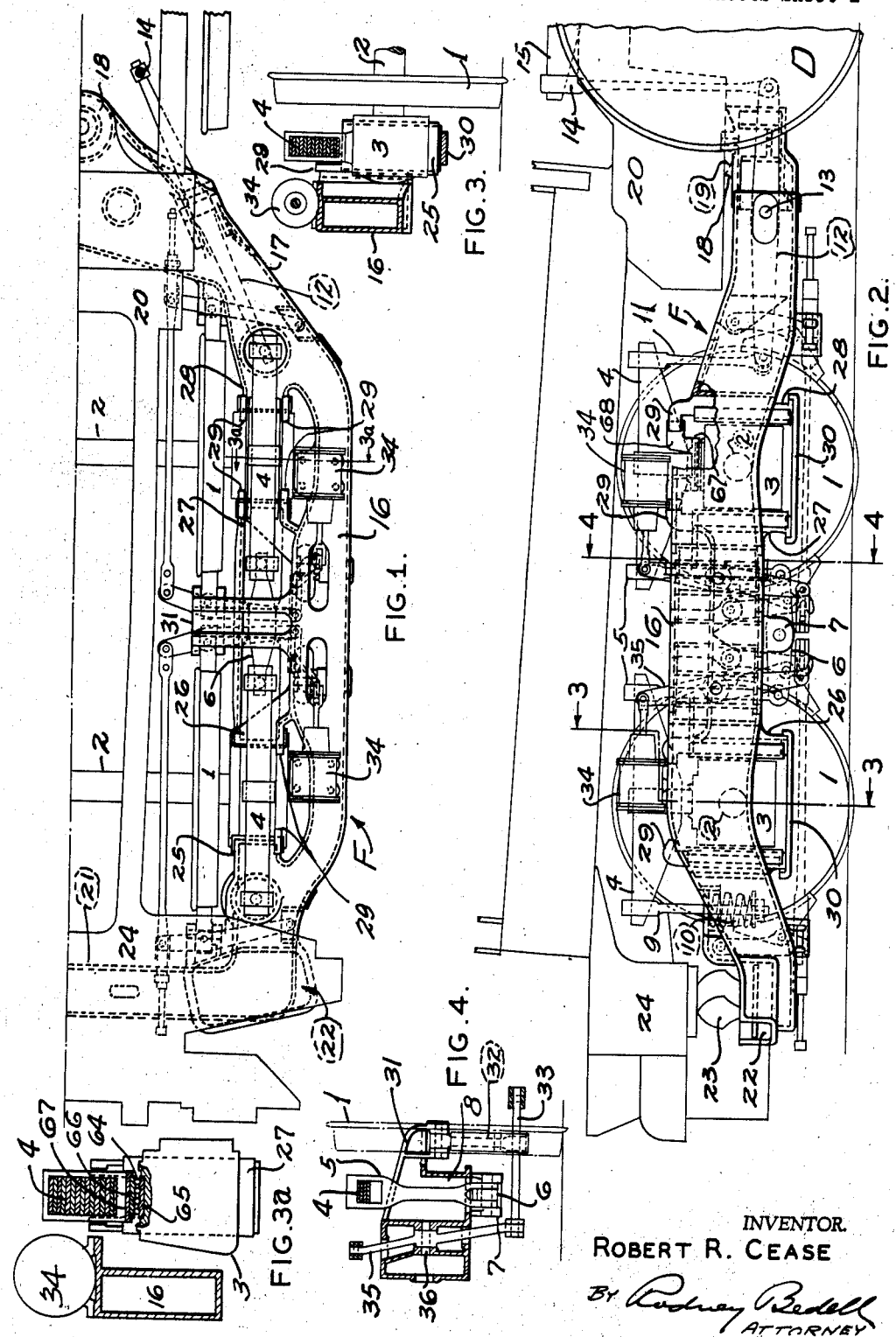

2,322,682

UNITED STATES PATENT OFFICE 2,322,682

RAILWAY TRUCK

Robert R. Cease, Nameoki, Ill., assignor to General Steel Castings Corporation, Granite City, Ill., a corporation of Delaware Application November 1, 1941, Serial No. 417,461

11 Claims. (Cl. 105—174)

The invention relates to railway rolling stock and consists in a truck construction, preferably of the radial type, upon which a vehicle body may be carried, and comprising wheeled axles, journal boxes and a truck frame supported from the journal boxes by spring means.

One of the objects of the invention is to facilitate access to the spring means mounted on the journal boxes so that the spring means can be easily inspected and readily replaced.

Another object is to avoid the contact of the springs with the truck frame or the aperturing of the truck frame, to clear the springs, to such an extent that the truck frame must be widened or deepened to an undesirable extent to provide sufficient strength.

Another object is to reduce the height of the truck frame above the rail.

Another object is to form a stronger and more economical truck frame for a given amount of metal.

Another object of the invention is to render the truck frame simpler and the truck construction less expensive by making possible the use of strap-type pedestal tie bars instead of the toe-type pedestal tie bars.

These and other detailed objects as will appear below are attained by the construction illustrated in the accompanying drawings in which—

Figure 1 is a top view of one longitudinal half of a locomotive four-wheel trailer truck, the truck frame being indicated in heavier lines than the remainder of the truck and the adjacent portions of the locomotive main frame for the purposes of clearer illustration of the invention.

Figure 2 is a side elevation of the structure shown in Figure 1.

Figures 3 and 4 are detailed vertical transverse sections taken on the corresponding section lines of Figure 2.

Figure 3a is a detail vertical transverse section taken on the line 3a—3a of Figure 1.

Figures 5 and 6 correspond to Figures 1 and 2 but include truck construction only and illustrate another form of the invention.

Figure 7 is a detailed vertical transverse section taken on the line 7—7 of Figure 6.

Figures 8 and 9 correspond to Figures 5 and 6 but illustrate another form of the invention.

The truck frame is indicated at F. The truck wheels are indicated at 1, their axles at 2 and the axle boxes at 3. The truck springs 4 are seated upon the axle boxes 3 and their adjacent ends are connected by links 5 to the ends of an equalizer bar 6 pivoted to lugs 7 depending from a bracket 8 on the truck frame. The other end of the rear spring 4 is yieldingly anchored to the truck frame by a link 9 and a coil spring 10. The other end of the forward spring 4 is connected by a link 11 to an equalizing bar 12, pivoted at 13 to the truck frame, and connected by a link 14 to the rear spring 15 of the main frame spring system supported on the boxes of the driving wheels, the rearmost of which is indicated at D. The wheel, spring and equalizer structure is well known in the art and in itself does not constitute the present invention.

The truck frame preferably consists of a one piece casting with side members or wheel pieces 16 converging at 17 and merging with each other to form a center plate portion 18 arranged to coact with the center plate portion 19 on the engine main frame 20 to effect a pivotal assembly of the truck and engine.

The truck frame includes a transverse rear member 21 connecting the rear ends of the sides and providing pockets 22 for the rockers 23 supporting the rear deck plate 24 of the engine, the truck center plate 18 and the rockers 23 providing a three point support for the engine frame by the truck frame. Preferably the truck frame members are of hollow box-shaped cross section to provide maximum strength for a given weight of material.

Each truck frame member 16 extends in a substantially straight line alongside the outer ends of axle boxes 3 and is provided with axle box guides 25, 26, 27 and 28 extending inwardly of the truck from the side members and arranged in pairs opposing each other to receive the corresponding axle boxes between them.

Each guide member 25, 26, 27 and 28 is provided with upwardly and laterally extending hook portions 29 projecting over the top of the box and serving as a safety member to limit the downward movement of the truck frame relative to the box in the event of failure of a portion of the spring system.

As indicated in Figure 3a, lateral motion rollers 64 are provided between the boxes on the forward axle and the corresponding springs supported by the boxes. These boxes are arranged to move laterally in the frame guides 27 and 28 so that the forward pair of wheels and the corresponding axle may move laterally in the truck to better accommodate lateral swinging of the truck relative to the framing of the locomotive when the latter is rounding curves. If desired, however, the rear pair of wheels, and their axle, may be arranged to move laterally relative to the truck instead of the front pair of wheels.

This lateral motion arrangement includes a roller seat member 65 with inclined top surfaces secured to the top of the journal boxes (Figure 3a). The rollers 64 are mounted on this member, and a top plate 66 with inclined bottom surfaces is mounted on the rollers. This top plate is secured to a spring seat 67 which supports the spring 4, and the spring seat 67 is provided with upwardly and longitudinally extending lugs 68 (Figure 2) having vertical sliding engagement with the inner faces of the safety lugs 29. With this arrangement, the safety lugs 29 position the spring seats 67, and their corresponding springs, between them to prevent lateral displacement of the spring relative to the truck frame, while permitting lateral movement of the box and the corresponding wheels and axle relative to the truck frame.

The lower ends of cooperating guides 25, 26 and 27, 28 are connected by strap ties 30. Since the longitudinal thrusts between the guides are transmitted through the truck side frame 16, these ties may be relatively light and need not be provided with toes fitting into the lower ends of the guides as is customary with axle box guide structure where the thrusts applied to the lower ends of the guides must be transmitted through frame members connected to the upper ends only of the guides.

Bracket 8 includes projections 31 supporting brake hangers 32 whereby brake beams 33 are suspended. The brakes are actuated by air pressure cylinders 34 mounted on the truck side frame 16 with their pistons operatively connected to levers 35 pivoted at 36 to the truck frame.

Figures 5, 6 and 7 illustrate another form of the invention in which each frame side member includes an intermediate portion 40 positioned at substantially the same level as the axle boxes 41 and extending in a straight line between the boxes and terminating in guides 42. At the ends of portion 40 the side frame extends outwardly and then longitudinally of the truck past the outer ends of the axles and their boxes, as indicated at 43, and then extends inwardly of the truck as in the frame previously described, the frame terminating in a rear transverse member 44 and in a forward transverse member 45 provided with a center plate 46. Axle box guides 47 and 48 are formed on the frame opposite to guides 42.

Safety lugs 49 extend upwardly from guide 48 and the associated guide 42 as in the frame previously described, and it will be understood that the box, and the spring support thereon, and the cooperating lugs preferably will correspond to the construction associated with the forward axle box in the truck previously described, as detailed in Figure 3a.

Another arrangement of the safety lug is indicated at 50 and is shown projecting upwardly of the truck from the adjacent frame portion 43 and then inwardly of the truck over the corresponding axle box 41. It will be understood that the respective safety lug arrangements illustrated for the front and rear axles may be reversed or that either safety lug arrangement may be used on both axles.

In this truck the equalizer bar 51 between the truck springs extends between and is pivoted to the upright side walls of the intermediate frame portion 40, and the links 52, connecting the ends of bar 51 to the truck springs 53, extend upwardly through openings 54 therefor in the top wall of the frame. Tie bars 55 extend across the openings between box guides 42, 47 and 48.

Figures 8 and 9 illustrate another form of the invention comprising a two wheel truck, the frame of which includes a side member 60 inclined from its forward center plate portion 61 outwardly and rearwardly to a point where it extends alongside of the axle box 62 and then extends inwardly to the cross member 63. This truck corresponds to those previously described except that with a single axle truck there would be no occasion ordinarily for providing for lateral motion of the box and the spring support. Obviously the safety lug arrangement provided for the forward axle in Figure 6 could be used for the single axle in Figures 8 and 9.

In each form of the invention the truck frame side members are positioned substantially below the level of the truck springs carried on the axle boxes and of the upper ends of the links suspended from the springs. Hence the springs are accessible from the side of the locomotive and may be removed and replaced more readily than in the ordinary construction where the springs are housed in the truck frame. The extension of the truck frame alongside the boxes makes it possible to utilize a deep frame without increasing the height of the truck as would follow the use of a deep frame extending over the axle boxes in the usual manner.

While the invention is shown as applied to a locomotive trailer truck of the radial type, the invention is not limited to such application but may be embodied in other swivel type trucks and supporting railway vehicles other than locomotives.

The invention may be embodied in a six-wheel truck, in which case it might be desirable to have the lateral motion spring support arrangement provided for more than one axle, and different conditions would determine the selection of the axles to be so equipped.

Other variations in the general arrangement of the truck, and particularly of the frame structure, may be made without departing from the spirit of the invention, and the exclusive use of such modifications as come within the scope of the claims is contemplated.

What is claimed is:

1. In a railway vehicle truck, spaced axles, wheels thereon, said axles having portions extending outwardly of the truck beyond said wheels, boxes on said portions, spring means mounted on said boxes, and a truck frame supported from said springs and including elements at the sides of said boxes for guiding the same in the relative vertical movements of the frame and boxes, said frame including side members positioned mainly abreast of the ends of axles and having portions extending between the guide elements for each box and beyond the end of the box and below the level of the corresponding spring means, the space between said wheels and axles being free of truck frame parts, and the end of said frame being provided with a center plate positioned longitudinally of the truck beyond the adjacent axle.

2. In a locomotive trailer truck, spaced axles, wheels thereon, said axles including portions extending outwardly of the truck beyond said wheels, boxes on said portions, a truck frame consisting of a one-piece metal casting and including side members extending in a substantially straight line alongside the outer ends of the boxes at the sides of the truck, there being axle box guides integral with and projecting inwardly from said side members at each side of each axle box, and spring means supporting said frame from said boxes, the ends of said side members at one end of the truck being connected by an integral part of the metal casting and provided with a center plate for pivotal attachment to a vehicle body, and the truck being free of frame structure between the axles and the side members.

3. A truck as described in claim 2 in which the axle box guides are provided with integral elements extending upwardly and towards each other to overhang the axle boxes and to engage the latter in the event of failure of the frame supporting spring means.

4. In a railway vehicle truck, spaced axles, wheels thereon, said axles having portions extending outwardly of the truck beyond said wheels, boxes on said portions, spring means mounted on said boxes, and a truck frame supported from said springs, the main longitudinal members of the frame being positioned at substantially the same level as the axle boxes and each having an intermediate portion aligned longitudinally of the truck with the axle boxes at that side of the truck and forming guides at one side of each box, each frame longitudinal member having portions extending from the intermediate portion around the outer ends of the boxes and inwardly towards the ends of the truck and provided with axle box guides opposing said first mentioned guides, there being an equalizer lever housed in each main longitudinal frame member intermediate portion and fulcrumed thereon with its ends supported from the spring means on the adjacent boxes.

5. In a railway vehicle truck, a wheeled axle with portions of the axle extending outwardly of the truck beyond the wheels, boxes mounted on said portions, a truck frame including side members extending abreast of said boxes and alongside the outer ends thereof and inclined inwardly from said boxes towards the ends of the truck, and spring means carried on said boxes and supporting said frame at opposite sides of the boxes, said frame including axle box guides projecting from the inclined portions of said side members towards said boxes and beneath said spring means, and having lugs projecting over the axle boxes to support the frame in the event of failure of the spring means.

6. A railway truck frame comprising longitudinal side members, a connection between adjacent ends of said side members arranged for pivotal connection to the vehicle main frame, and axle box guides extending inwardly from said side members, said side members, connection and guides being in substantially the same horizontal plane, the frame being formed in one piece with its side members of box-shaped cross section.

7. In a railway vehicle truck, spaced axles, wheels thereon, boxes on said axles, springs mounted on said boxes, and a truck frame supported from said springs with the main longitudinal members of said frame adjacent said springs positioned below the level thereof and outwardly of the boxes and provided with guides for said boxes, the boxes on at least one of said axles being arranged to provide for lateral movement of said axle and boxes relative to the truck frame, and said frame including a pair of spaced lugs adjacent each of the latter-mentioned boxes for positioning the corresponding spring between them to prevent lateral displacement of said spring relative to said frame while permitting lateral movement of the box relative to the truck frame.

8. A railway truck as described in claim 7 in which the spaced lugs also overhang the corresponding journal box to limit the downward movement of the frame relative to the box.

9. A railway truck as described in claim 7 which includes a pair of the spaced lugs on each guide at each side of a laterally movable axle box.

10. A railway truck as described in claim 7 which includes a spring seat between each laterally movable axle box and its spring and positioned between the spaced lugs adjacent thereto.

11. In a locomotive trailer truck, spaced axles, wheels thereon, said axles including portions extending outwardly of the truck beyond said wheels, boxes on said portions, a truck frame including a side member extending in a substantially straight line alongside the outer ends of the boxes at the same side of the truck, there being axle box guides projecting inwardly from said side member at each side of each axle box, there being a bracket extending inwardly from the frame side member and between adjacent axle boxes, an equalizing lever pivoted intermediate its ends to said bracket, spring means carried by the adjacent boxes and supporting the ends of said lever, and brake gear supported from said bracket inwardly of the truck from said equalizing lever.

ROBERT R. CEASE.